United States Patent [19]
Lohman

[11] Patent Number: 4,638,890
[45] Date of Patent: Jan. 27, 1987

[54] BRAKE DEVICE FOR A CYCLE

[75] Inventor: Oskar E. Lohman, Nacka, Sweden

[73] Assignee: AB Trama, Nacka, Sweden

[21] Appl. No.: 631,434

[22] PCT Filed: Nov. 15, 1983

[86] PCT No.: PCT/SE83/00401
§ 371 Date: Jul. 13, 1984
§ 102(e) Date: Jul. 13, 1984

[87] PCT Pub. No.: WO84/01924
PCT Pub. Date: May 24, 1984

[30] Foreign Application Priority Data
Nov. 15, 1982 [SE] Sweden ............... 8206473

[51] Int. Cl.⁴ .............. B62L 5/00; F16D 63/00
[52] U.S. Cl. .................. 188/24.17; 188/30;
188/82.3; 192/5; 192/12 B
[58] Field of Search ........ 188/24.17, 2 D, 16,
188/17, 26, 30, 69, 82.2, 82.3, 82.34, 82.5; 192/6
A, 12 B, 41 R, 5; 74/159, 594.2; 280/261

[56] References Cited
U.S. PATENT DOCUMENTS

| | | | |
|---|---|---|---|
| 633,605 | 9/1899 | McAnulty et al. | 192/5 |
| 3,506,100 | 4/1970 | Tomozawa | 192/12 B X |
| 3,888,334 | 6/1975 | Mack | 188/24.17 |
| 3,892,301 | 7/1975 | Frei et al. | 192/6 A X |
| 4,134,481 | 1/1979 | Calderazzo | 188/24.17 X |
| 4,260,044 | 4/1981 | Foster | 188/24.17 X |

FOREIGN PATENT DOCUMENTS 0198302 6/1938 Switzerland ............... 192/5

Primary Examiner—George E. A. Halvosa
Assistant Examiner—Robert J. Oberleitner
Attorney, Agent, or Firm—Beveridge, DeGrandi and Weilacher

[57] ABSTRACT

The brakes of a bicycle are actuated in response to rotation of the pedal crank in a reverse direction. The brake actuating mechanism includes an actuating member which is connected to the pedal crank by a freewheel and a slip coupling. The freewheel is disengaged during forward rotation of the pedal crank, and it is engaged during reverse rotation of the pedal crank to move the actuating member and operate the brakes. During heavy braking, the slip coupling reduces the force exerted by the actuating mechanism on the brake operating cables. Movement of the actuating member also unblocks a freewheel which normally blocks reverse rotation of a driven wheel of the bicycle. This unblocking action prevents the pedals from locking after heavy braking.

9 Claims, 9 Drawing Figures

BRAKE DEVICE FOR A CYCLE

BACKGROUND OF THE INVENTION

Bicycles provided with gear transmissions typically have the drawback that they lack pedal operated brakes. This is disadvantageous from the point of traffic security, firstly because it is not possible to produce the same braking force as in brakes operated by the feet and, secondly, because persons familiar with single gear bicycles often face difficulties when they have to use the hand brakes instead of the foot brakes. Especially in panic situations, such persons often act in reflex and the result is frequently that no braking at all takes place. A further disadvantage is that only one hand is available for the braking operation when the bicycle driver is using one hand to indicate a change of direction.

These and other reasons have resulted in many attempts to provide a brake which permits pedal operated braking in connection with multi-geared bicycles.

The suggested solutions, however, have been too complicated, and they have respectively necessitated such changes in the construction of the bicycle that they have not reached a more extensive use.

SUMMARY OF THE INVENTION

According to the present invention, a cycle braking system comprises a brake actuating member which is connected by a freewheel means to the pedal crank assembly of the bicycle. The freewheel means is disengaged when the pedal crank assembly is driven in a forward direction, and it is engaged when the pedal crank assembly is driven in a reverse direction, thereby moving the brake actuating member to its active position where it actuates the cycle brakes which are connected thereto. The characterizing feature of the invention is that a slip coupling means is connected to the freewheel means for reducing the force transmitted from the pedal crank assembly to the brake actuating member during heavy braking.

Preferably, the invention also involves a second freewheel which is mounted on the hub of a driven wheel of the vehicle. This second freewheel operates in a direction which is opposite to the freewheel means on the pedal crank assembly, in the respect that the second freewheel has a blocking action for rotating the driven wheel of the vehicle in a forward direction in response to forward rotation of the pedal crank. Means are provided for deactivating the second freewheel in response to movement of the brake actuating member to its active position, thereby releasing the driven wheel to permit the pedal crank assembly from locking after heavy braking.

In one embodiment, the freewheel on the pedal crank assembly includes a ratchet wheel, pawls which are mounted on a ring and engage the ratchet wheel, and the brake actuating member is non-rotatably connected to the ring. The slip coupling in this embodiment includes a sleeve which is non-rotatably mounted on the pedal crank shaft. The ratchet wheel is rotatably mounted on the sleeve, and a compression spring axially biases together the sleeve and a surface on the ratchet wheel.

In another embodiment, the freewheel on the pedal crank assembly has a center portion, a sleeve which is rotatable on the center portion, and an inter-engaging blocking means on the sleeve and center portion for providing a blocking action in only one direction. The sleeve has a flange which is engaged with the brake actuating member to deter rotation between the sleeve and the brake actuating member, and a spring is provided for axially biasing together the flange and the brake actuating member.

BRIEF DESCRIPTION OF THE DRAWINGS

The accompanying drawings illustrate some exemplary embodiments of the invention, wherein.

DETAILED DESCRIPTION

Figure 1:
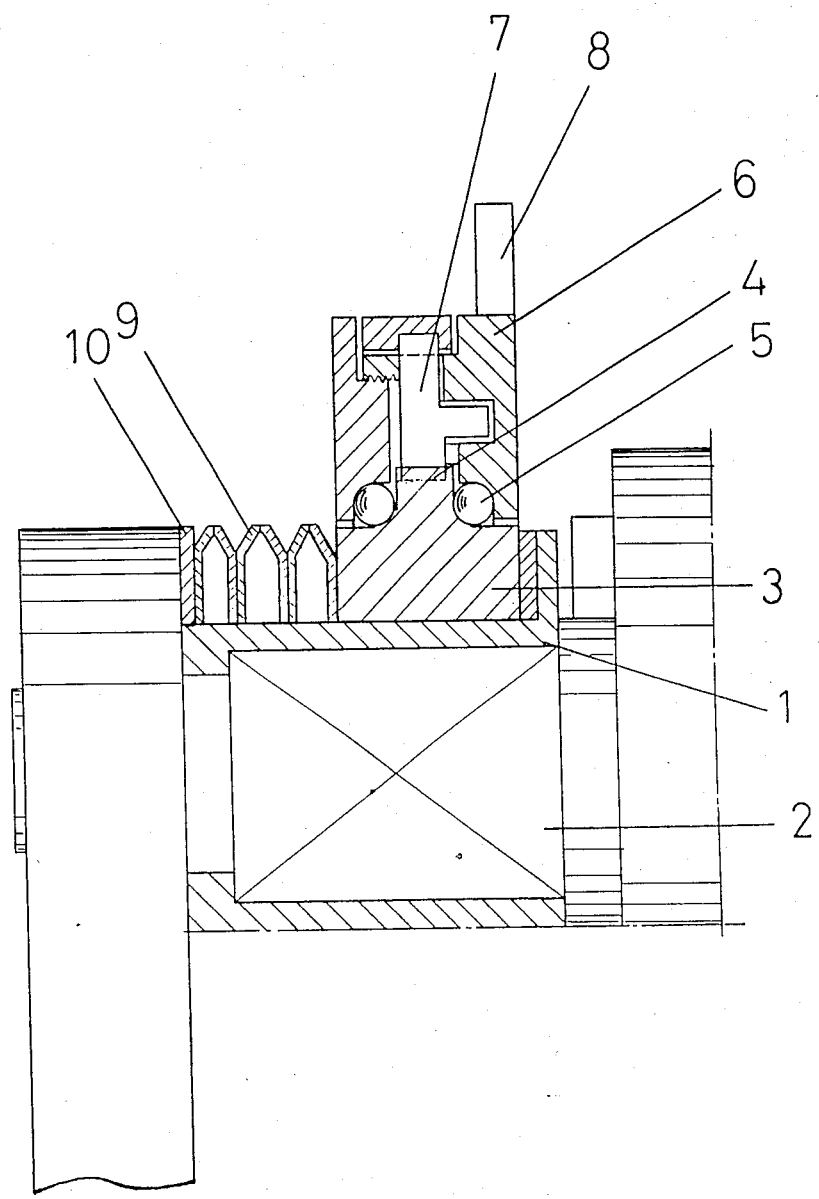
FIG. 1 is a partial section through a freewheel and a friction coupling connected to the crank portion of a bicycle according to a first embodiment of the invention.
Figure 2:
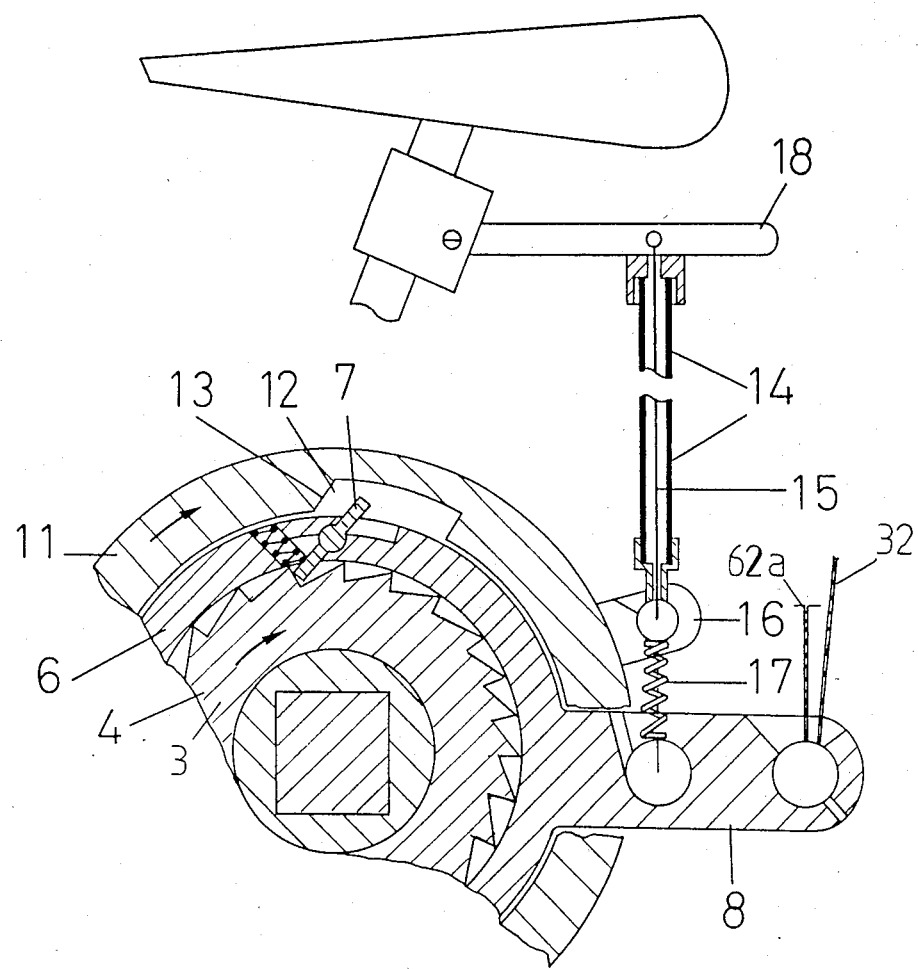
FIG. 2 is a transverse section through the device shown in FIG. 1.
Figure 3:
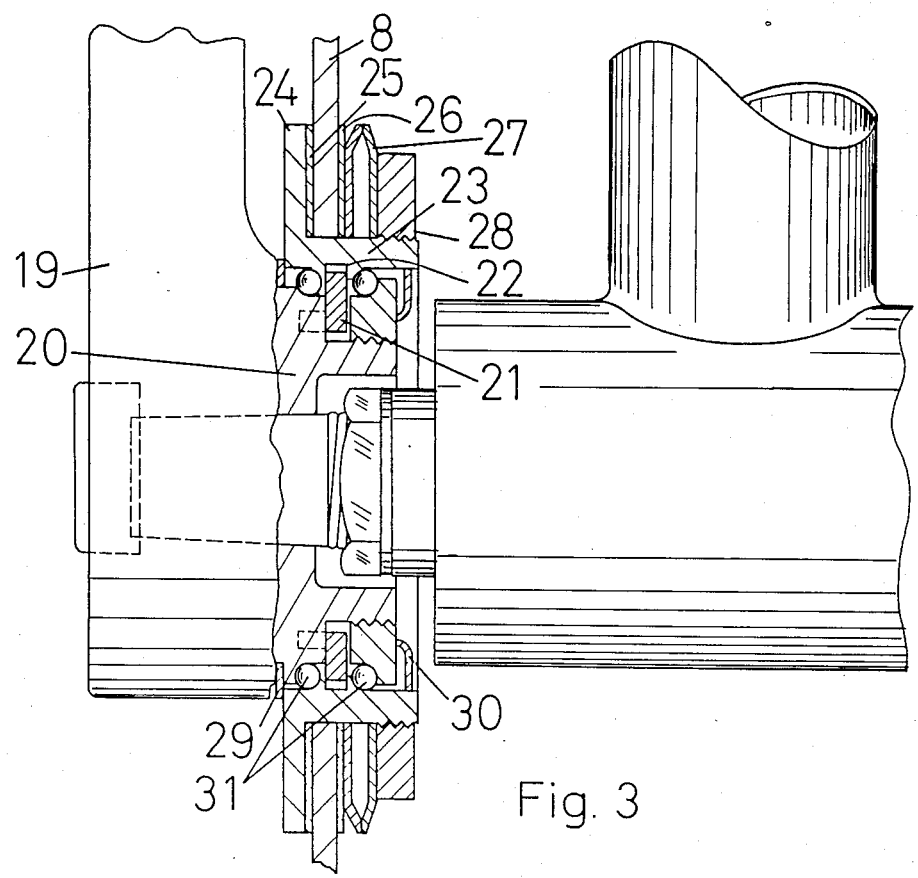
FIG. 3 is a section through a second embodiment of a freewheel and friction coupling device connected to the crank portion of a bicycle.

The device shown in FIGS. 1–3 has a main object to constitute a freewheel with a slippable friction coupling at the pedal crank of the bicycle. According to the embodiment of FIG. 1, a sleeve 1 is non-rotatably connected to the crank shaft 2 of a bicycle. This crank shaft together with the pedals and pedal arms comprise the pedal crank assembly of the bicycle. Rotatably mounted over the sleeve 1 is a rotational member 3, preferably designed as a part of a ball bearing ring, said member 3 being formed as or connected to a ratchet wheel 4.

Rotatably mounted over the rotational member 3 via balls 5 is a ring 6 provided with one or several catches 7, intended to cooperate with the ratchet wheel 4. The ratchet teeth are directed so that the catch or the catches 7 will slide over the teeth when the pedals are actuated for moving the bicycle in a forward direction. However, when the pedals are actuated in the opposite direction, the catch or the catches 7 engage the teeth of the ratchet wheel 4 so that the ratchet wheel carries with it the ring 6 in a clockwise direction. An arm or a disk 8 is securely fixed to the ring 6 and the former thus will be moved as described. It has been presumed that the rotational member 3 and ratchet wheel 4 are usually rotatable with the crank shaft. This is due to the action of a compression spring 9 having one end thereof resting against an annular washer 10 supported, for instance, by one of the crank arms. The opposite end of the spring 9 bears against one end surface of the rotational member 3. The arm or disk 8 is a brake actuating member in the respect that, when it is moved in a clockwise direction from its inactive position to its active position, it operates one or several brakes shown in FIGS. 6–8. It also actuates a device shown in FIG. 4 or 5 which releases a freewheel on the driven wheel of the bicycle.

The brake force which can be exerted by the foot is considerably greater than the force that can be obtained from a hand operated brake. This means that a heavy braking motion will impose a considerable tension upon the transmission means such as cables, which transmit the power from the pedals to the brakes and to the device for releasing the freewheel on the driven wheel. There is thus a pronounced risk that such a sudden force can cause the cable to break. When such a heavy braking takes place in the illustrated embodiment, the rotational member 3 slips in relation to the sleeve 1, acting as a slip coupling means which reduces the transmitted power to a value which the transmission can withstand.

A certain advantage when parking a bicycle provided with the device now described is that the rear wheel will lock itself when attempts are made to move a parked bicycle backwards. This renders rapid stealings impossible. In order to enable the owner of the bicycle to handle his bicycle after parking, it is possible to arrange, as shown in FIG. 2, a preferably lockable release device associated with the saddle. For this purpose, an outer ring 11 is turnably mounted over the ring 6. This outer ring is provided with one or several recesses 12 with walls which cause the catch or the catches 7 to disengage the teeth of the ratchet wheel the outer ring is turned in relation to the ring 6 in the direction of the arrow. It is understood that the freewheel 4, 7 thereby becomes inactive which in turn makes the pedals free to move in both directions. The relative movement between the outer ring 11 and the ring 6 is, in the illustrated embodiment, produced by a wire 15 of a cable 14. The cable 14 acts upon an arm 8. A compression spring 17 normally holds arm 8 at a distance from an arm 16 which is securely connected to the outer ring 11. The cable housing 14 is connected to the arm 16 and, at the opposite end thereof, the cable is connected to a lever 18 which is pivotally mounted to the attachment for the saddle. This release of the freewheel is accomplished by moving the lever 18 upwards. It is possible to make this lever lockable to prevent unauthorized people from moving the bicycle backwards.

FIG. 3 shows, partly in section, a more compact design of a device having the same function as the device shown in FIGS. 1 and 2, except that the FIG. 3 device does not have a mechanism for releasing the freewheel on the pedal shaft. According to this embodiment, one pedal arm 19 of the bicycle is provided with a center part 20 to which a number of catches 21 are pivotally connected. These catches cooperate in a manner just described with a sprocket 22 of a runner 23, which is rotatably mounted about the center part 20. A friction lining 25 acts against a flange 24 on part 20 and against one side of the arm or disk 8. A second friction lining 26 rests against the opposite side of the arm or disk 8. A compression spring 27 has one end thereof resting against the friction lining and the opposite end thereof resting against a ring 28 secured to the runner 23. This spring 27 keeps the parts 24, 25, 8 and 26 pressed against each other. The device shown in FIG. 3 leaves the arm or disk 8 uninfluenced during forward pedaling, but it moves the arm or disk 8 when reverse pedaling occurs. Additionally, the arm or disk 8 slips in case the transmitted power exceeds a predetermined value. It is, of course, possible to add the manual release of the freewheel 21, 22 corresponding to the principle illustrated in FIG. 2. In FIGS. 3, 29 and 30 denote packings and 31 denotes balls for the mounting of the runner 23.

The devices connected to the pedal portion of the bicycle described in FIGS. 1–3 move the arm or disk 8 to an active position when braking with the foot takes place, thereby moving transmission means such as cables which actuate the brakes and, as will be subsequently described, a freewheel provided in the rear hub of the bicycle.

Figure 6:
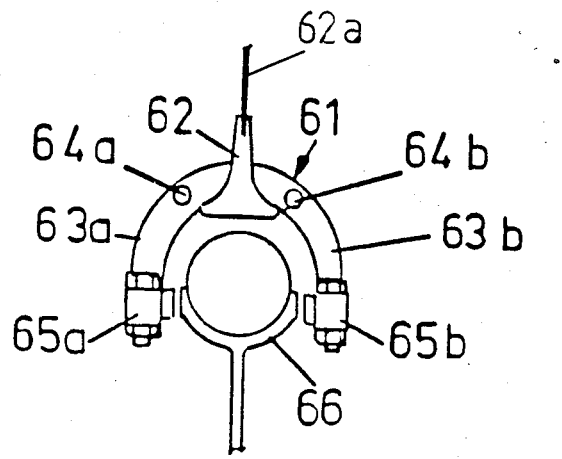
FIG. 6 schematically shows a rim brake.
Figure 7:
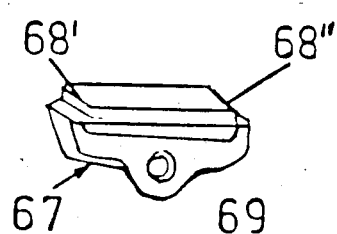
FIG. 7 in perspective shows a brake element of the rim brake of FIG. 6.
Figure 8:
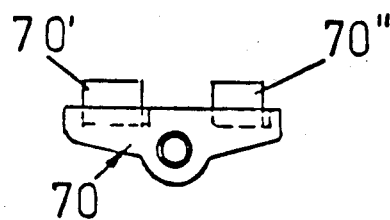
FIG. 8 is a modification of the element of FIG. 7.

FIG. 6 illustrates the construction of a rim brake, generally designated as 61. An acutating means 62, operated by a cable 62a which is connected to the arm 8 as shown in FIG. 2, simultaneously actuates two braking elements 63a, 63b pivoted to shafts 64a and 64b. Brake blocks 65a, 65b act against two opposite sides of a rim 66. As shown in FIG. 7, each brake block 67 is rockable about a center 69. By this arrangement the blocks will first act with a first surface 68' and thereupon with a second surface 68". Because the blocks are not rigidly mounted, an improved contact with the rim and consequently also an improved braking effect is achieved. As appears from FIG. 8, the brake blocks 70 can have their active parts 70' and 70" in the form of spaced-apart portions.

Figures 5, 5A:
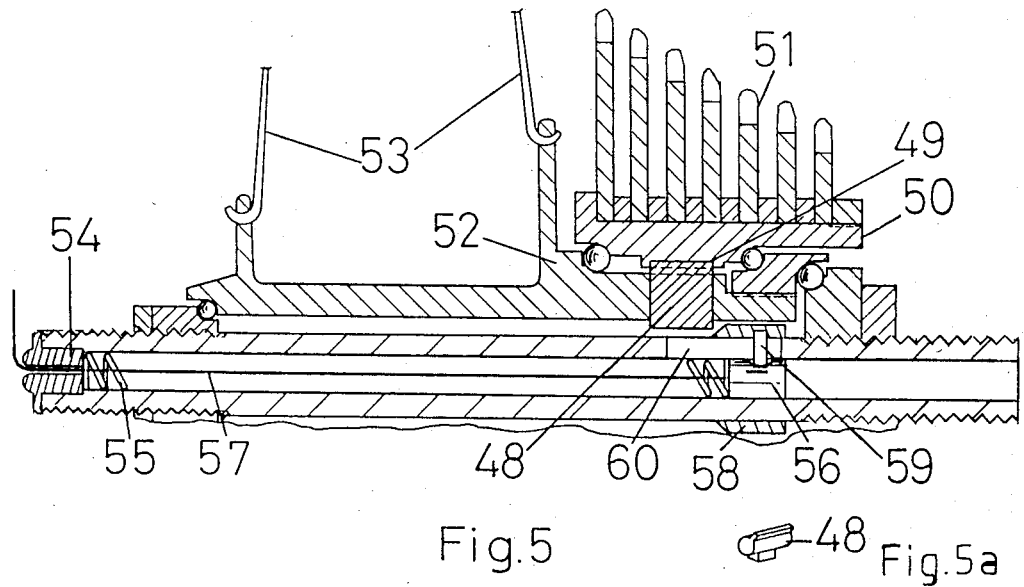
FIG. 5 is a section through a second embodiment of a releasable freewheel device incorporated in the rear hub of a bicycle.
FIG. 5a shows a pawl of the type used in FIG. 5.
Figure 4:
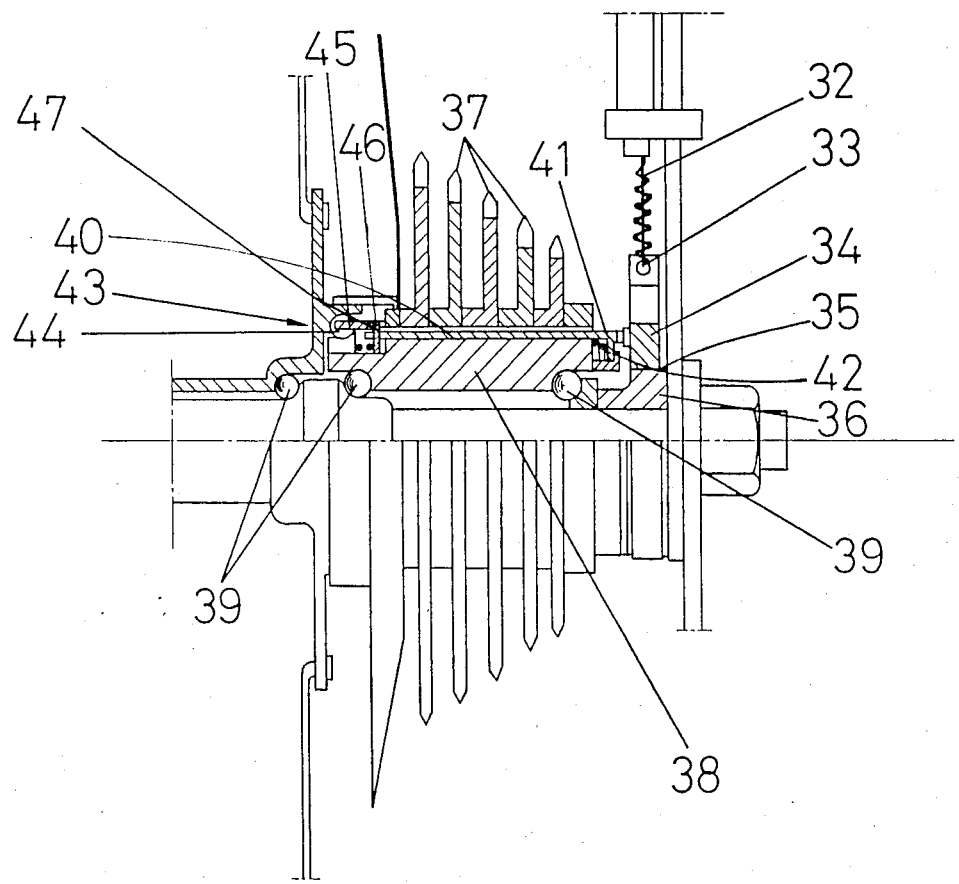
FIG. 4 is a longitudinal section through a first embodiment of a releasable freewheel device connected to the rear hub of a bicycle.

FIGS. 4 and 5 show how the catch action of a freewheel provided in the rear wheel of the bicycle can be released. In the embodiment shown in FIG. 4, the arm 8 is connected by a wire 32 or the like to the rear wheel of the bicycle in a manner to be described more in detail. The wire 32 in this case is connected to a projection 33 of a disk 34 which by a screw thread 35 is connected to the stationary shaft 36 of the rear hub. It is evident that actuation of the wire 32 will turn the disk 34 to produce an axial displacement of the disk due to the screw thread engagement.

A number of sprockets 37 of various diameters are, in a known manner, threaded upon a runner 38 which is rotatably mounted over the shaft 36 by balls 39 or the like for reduced friction. A number of actuating means 41 extend through longitudinal grooves 40 in the runner 38. Each of these members 41 has one end which abuts a side surface of the disk 34 and an opposite end which has obliquely cut surfaces. A spring means 42 tends to move the actuating means 41 into contact with the disk 34. The freewheel 43 of the rear wheel is provided with balls 44 which are known in such devices. However, according to the invention, these balls 44 can be brought out of catching positions by means of a disk 46 provided with axially projecting fingers 45. The disk 46 has a number of openings 47 which are elongated in peripheral direction and which are penetrated by the actuating means 41. The corresponding ends of members 41 are obliquely cut. The elongation of the openings 47 gives the disk a limited turning movement when the actuating means 41 are axially displaced. During this turning movement, the fingers 45 of the disk 46 bring the balls out of their active catching positions, thereby rendering the catch inactive. When the wire 32 is pulled by disk or arm 8, the actuating means 41 in the rear hub will be displaced in the length direction thereof. This displacement brings the catches 44 out of catching position to release the freewheel. It is also possible to let the actuating means 41 act directly upon the balls 44.

According to the embodiment shown in FIG. 5, the catching elements are pivoted pawls 48 which cooperate with teeth 49 formed in a first sleeve 50 to which sprocket wheels 51 of various diameters are secured. The pawls 48 are pivoted on a second sleeve 52 which supports the spokes 53 of the wheel. Sleeve 52 is rotatably mounted about a hollow shaft 54 which constitutes the stationary shaft of the rear hub. In this hollow shaft 54, a plunger 56 is displaceably mounted and moveable against the action of a spring 55, said plunger being displaced by means of a wire 57. A sleeve 58 having its left end bevelled is displaceably mounted relative to the hollow shaft 54. This sleeve 58 is connected to the plunger 56 by a pin 59 or the like which protrudes through a slot 60 provided in the hollow shaft. A pull in the wire 57 by an arm or disc displaces the plunger 56 and the sleeve 58. During this displacement, the respective pawls 48 are swung away and disengaged from the sprocket wheel to prevent the one way blocking between the sleeves 50 and 52.

The device now described works in the following manner. During forward pedaling, the arm 8 is in a stationary inoperative position. When, however, the pedals for braking purposes are moved backwards, the arm 8 will follow this movement. This movement, transmitted by cable 62a, causes the brakes 61 of the bicycle to be activated, and it also causes the blocking action of the freewheel of the rear hub to cease. If the freewheel of the rear hub were not released, the freewheel would have locked the pedals during heavy braking, making it impossible to continue pedaling until said locking action in one way or another had been suppressed.

I claim:

1. A system for braking at least one wheel of a cycle, comprising:
    brakes which are operable to brake the rotational movement of the wheel,
    actuating means for operating the brakes, said actuating means including a brake actuating member which is operatively connected to the brakes and is movable from an inactive position to an active position where it actuates the brakes of the cycle,
    a pedal crank assembly which is rotatable in a forward direction to drive the cycle and is rotatable in a reverse direction to move the brake actuating member to its active position to actuate the brakes,
    a freewheel means which connects the pedal crank assembly to the brake actuating member, said freewheel means being disengaged when the pedal crank assembly is driven in a forward direction and being engaged when the pedal crank assembly is driven in a reverse direction to move the brake actuating member to its active position,
    a slip coupling means connected to the freewheel means and, together with said freewheel means, connecting the pedal crank assembly to the brake actuating member, said slip coupling means being operable when the pedal crank assembly is forced in a rearward direction to reduce the force transmitted from the pedal crank assembly to the brake actuating member during heavy braking.

2. The invention according to claim 1 wherein the cycle has a driven wheel with a hub which has a second freewheel thereon, said second freewheel operating in a direction which is opposite to the freewheel means which connects the pedal crank assembly to the brake actuating member, said second freewheel having a blocking action for rotating the driven wheel in a forward direction in response to movement of said pedal crank assembly in a forward direction, and means for deactivating the second freewheel in response to movement of the brake actuating member to its active position, thereby releasing the driven wheel to prevent the pedal crank assembly from locking after heavy braking.

3. The invention according to claim 1 wherein the freewheel means includes a ratchet wheel, a ring, and pawls; said pawls being mounted on the ring and engaging the ratchet wheel, said brake actuating member being nonrotatably connected to said ring of the freewheel;
    said slip coupling means including a sleeve and a compression spring, said sleeve being nonrotatably mounted on the pedal crak assembly, said ratchet wheel being rotatably mounted on said sleeve and having a surface which engages the sleeve to deter such rotation between the ratchet wheel and the sleeve, said compression spring axially biasing together the sleeve and said surface.

4. The invention according to claim 3 wherein the cycle has a driven wheel with a hub which has a second freewheel thereon, said second freewheel operating in a direction which is opposite to the freewheel means which connects the pedal crank assembly to the brake actuating member, said second freewheel having a blocking action for rotating the driven wheel in a forward direction in response to movement of said pedal crank assembly in a forward direction, and means for deactivating the second freewheel in response to movement of the brake actuating member to its active position, thereby releasing the driven wheel to prevent the pedal crank assembly from locking after heavy braking.

5. The invention according to claim 1 wherein the freewheel means includes a center portion,
    a sleeve which is rotatable on the center portion, said center portion and said sleeve having interengaging blocking means for providing a blocking action in only one direction,
    said sleeve having a flange which is engaged with said brake actuating member to deter rotation between the sleeve and the brake actuating member, and a spring for axially biasing together said flange and said brake actuating member.

6. The invention according to claim 5 wherein the cycle has a driven wheel with a hub which has a second freewheel thereon, said second freewheel operating in a direction which is opposite to the freewheel means which connects the pedal crank assembly to the brake actuating member, said second freewheel having a blocking action for rotating the driven wheel in a forward direction in response to movement of said pedal crank assembly in a forward direction, and means for deactivating the second freewheel in response to movement of the brake actuating member to its active position, thereby releasing the driven wheel to prevent the pedal crank assembly from locking after heavy braking.

7. A system for braking at least one wheel of a cycle, comprising:
    brakes which are operable to brake the rotational movement of the wheel,
    actuating means for operating the brakes, said actuating means including a brake actuating member which is operatively connected to the brakes and is movable from an inactive position to an active position where it actuates the brakes of the cycle,
    a pedal crank assembly which is rotatable in a forward direction to drive the cycle and is rotatable in a reverse direction to move the brake actuating member to its active position to actuate the brakes,
    a freewheel means which connects the pedal crank assembly to the brake actuating member, said freewheel means being disengaged when the pedal crank assembly is driven in a forward direction and being engaged when the pedal crank assembly is driven in a reverse direction to move the brake actuating member to its active position, a slip coupling means connected to the freewheel means for reducing the force transmitted from the pedal crank assembly to the brake actuating member during heavy braking, said cycle having a driven wheel with a hub which has a second freewheel thereon, said second freewheel operating in a direction which is opposite to the freewheel means which connects the pedal crank assembly to the brake actuating member, said second freewheel having a blocking action for rotating the driven wheel in a forward direction in response to movement of said pedal crank assembly in a forward direction, and means for deactivating the second freewheel in response to movement of the brake actuating member to its active position, thereby releasing the driven wheel to prevent the pedal crank assembly from locking after heavy braking.

8. A system for braking at least one wheel of a cycle, comprising:

brakes which are operable to brake the rotational movement of the wheel, actuating means for operating the brakes, said actuating means including a brake actuating member which is operatively connected to the brakes and is moveable from an inactive position to an active position where it actuates the brakes of the cycle, a pedal crank assembly which is rotatable in a forward direction to drive the cycle and is rotatable in a reverse direction to move the brake actuating member to its active position to actuate the brakes, a freewheel means which connects the pedal crank assembly to the brake actuating member, said freewheel means being disengaged when the pedal crank assembly is driven in a forward direction and being engaged when the pedal crank assembly is driven in a reverse direction to move the brake actuating member to its active position, a slip coupling means connected to the freewheel means for reducing the force transmitted from the pedal crank assembly to the brake actuating member during heavy braking, said freewheel means including a center portion, a sleeve which is rotatable on the center portion, said center portion and said sleeve having interengaging blocking means for providing a blocking action in only one direction, said sleeve having a flange which is engaged with said brake actuating member to deter rotation between the sleeve and the brake actuating member, and a spring for axially biasing together said flange and said brake actuating member.

9. The invention according to claim 8 wherein the cycle has a driven wheel with a hub which has a second freewheel thereon, said second freewheel operating in a direction which is opposite to the freewheel means which connects the pedal crank assembly to the brake actuating member, said second freewheel having a blocking action for rotating the driven wheel in a forward direction in response to movement of said pedal crank assembly in a forward direction, and means for deactivating the second freewheel in response to movement of the brake actuating member to its active position, thereby releasing the driven wheel to prevent the pedal crank assembly from locking after heavy braking.

* * * * *

UNITED STATES PATENT AND TRADEMARK OFFICE
CERTIFICATE OF CORRECTION

PATENT NO. : 4,638,890

DATED : January 27, 1987

INVENTOR(S) : Oskar R. Lohman

It is certified that error appears in the above-identified patent and that said Letters Patent is hereby corrected as shown below:

On the title page, Item [75], should read

-- Oskar R. Lohman --.

Signed and Sealed this

Fourteenth Day of March, 1989

Attest:

DONALD J. QUIGG

Attesting Officer

Commissioner of Patents and Trademarks